(12) United States Patent
Murakami et al.

(10) Patent No.: US 10,107,349 B2
(45) Date of Patent: Oct. 23, 2018

(54) SHOCK ABSORBER AND MANUFACTURING METHOD THEREFOR

(71) Applicant: HITACHI AUTOMOTIVE SYSTEMS, LTD., Ibaraki (JP)

(72) Inventors: Hiroshi Murakami, Ebina (JP); Teruaki Yamanaka, Ayase (JP); Osamu Shioume, Kasugai (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/512,922

(22) PCT Filed: Aug. 27, 2015

(86) PCT No.: PCT/JP2015/074135
§ 371 (c)(1),
(2) Date: Mar. 21, 2017

(87) PCT Pub. No.: WO2016/067733
PCT Pub. Date: May 6, 2016

(65) Prior Publication Data
US 2017/0299009 A1 Oct. 19, 2017

(30) Foreign Application Priority Data

Oct. 31, 2014 (JP) ................................. 2014-223271

(51) Int. Cl.
*F16F 9/34* (2006.01)
*F16F 9/06* (2006.01)
(Continued)

(52) U.S. Cl.
CPC .................. *F16F 9/34* (2013.01); *F16F 9/06* (2013.01); *F16F 9/325* (2013.01); *F16F 9/3235* (2013.01);
(Continued)

(58) Field of Classification Search
CPC ...... F16F 9/34; F16F 9/435; F16F 9/06; F16F 9/3235; F16F 9/50; F16F 222/12;
(Continued)

(56) References Cited

U.S. PATENT DOCUMENTS

| 5,282,645 A | * | 2/1994 | Spakowski | F16F 9/46 137/854 |
| 5,740,890 A | * | 4/1998 | Forster | F16F 9/325 188/322.13 |
| 5,960,915 A | * | 10/1999 | Nezu | F16F 9/325 188/266.6 |
| 6,079,526 A | * | 6/2000 | Nezu | F16F 9/46 188/266.6 |

(Continued)

FOREIGN PATENT DOCUMENTS

| JP | 2012-72857 | 4/2012 |
| JP | 2013-96490 | 5/2013 |

OTHER PUBLICATIONS

International Search Report dated Nov. 2, 2015 in International Application No. PCT/JP2015/074135.

*Primary Examiner* — Thomas J Williams
*Assistant Examiner* — Mariano Sy
(74) *Attorney, Agent, or Firm* — Wenderoth, Lind & Ponack, L.L.P.

(57) ABSTRACT

A baffle plate (41, partition member) is manufactured by being integrally formed of a single material including flexible or pliable NBR (nitrile rubber), and a projection (51) formed on an abutment surface (42B) of the baffle plate (41) is fitted into a recess (52) in a reduced-diameter portion (36) of an intermediate tube (20). Thus, when the intermediate tube (20) fitted with the baffle plate (41) is assembled into an outer tube, the sheet-shaped baffle plate (41) can be prevented from rotating about a connecting pipe (23), and it is possible to improve the productivity and assembleability of the shock absorber.

7 Claims, 5 Drawing Sheets

(51) Int. Cl.
  *F16F 9/32* (2006.01)
  *F16F 9/43* (2006.01)
  *F16F 9/50* (2006.01)
(52) U.S. Cl.
  CPC ............ *F16F 9/435* (2013.01); *F16F 9/50* (2013.01); *B60G 2202/24* (2013.01); *B60G 2500/10* (2013.01); *F16F 2222/12* (2013.01); *F16F 2228/066* (2013.01); *F16F 2232/08* (2013.01)
(58) Field of Classification Search
  CPC ............ F16F 2228/066; F16F 2232/08; B60G 2202/24; B60G 2500/10
  USPC ............ 188/322.19, 322.2, 266.6, 269
  See application file for complete search history.

(56) References Cited

U.S. PATENT DOCUMENTS

| | | | |
|---|---|---|---|
| 6,182,805 B1* | 2/2001 | Kashiwagi | F16F 9/325 188/266.6 |
| 8,292,047 B2* | 10/2012 | Vannucci | F16F 9/461 188/266.5 |
| 8,468,162 B2* | 6/2013 | Najjar | G06F 17/30985 382/238 |
| 9,169,888 B2* | 10/2015 | Nishimura | F16F 9/325 |
| 9,500,252 B2* | 11/2016 | Yamashita | F16F 9/3484 |
| 9,856,939 B2* | 1/2018 | Matsumoto | F16F 9/3415 |
| 2012/0073920 A1* | 3/2012 | Yamasaki | B60G 17/08 188/315 |

* cited by examiner

SHOCK ABSORBER AND MANUFACTURING METHOD THEREFOR

TECHNICAL FIELD

The present invention relates to a shock absorber generating a damping force by controlling the flow of a hydraulic fluid in relation to the movement of a piston rod and also relates to a manufacturing method therefor.

BACKGROUND ART

Patent Literature 1 discloses a damping force adjustable hydraulic shock absorber of the type having a control valve mounted alongside and including a partition member (baffle plate). In the shock absorber, the partition member is manufactured by vulcanization-bonding a rubber partition, which is an elastic seal member, to a metallic plate part. In this regard, however, there is a demand that the baffle plate be further improved in productivity and assembleability.

CITATION LIST

Patent Literature

Patent Literature 1: Japanese Patent Application Laid-Open Publication No. 2012-72857

SUMMARY OF INVENTION

Technical Problem

The present invention has been made in view of the above-described circumstances, and an object of the present invention is to improve the productivity and assembleability of a shock absorber having a partition member in a reservoir.

Solution to Problem

To solve the above-described problem, the present invention provides a shock absorber to be installed between two members movable relative to each other. The shock absorber includes a cylinder having a hydraulic fluid sealed therein, a piston inserted in the cylinder, a piston rod connected to the piston and extending to the outside of the cylinder, an outer tube provided around the outer periphery of the cylinder, a reservoir formed between the cylinder and the outer tube and having the hydraulic fluid and a gas sealed therein, an intermediate tube provided between the cylinder and the outer tube, a reduced-diameter portion formed at each end of the intermediate tube, an annular groove formed in the reduced-diameter portion to accommodate a seal member sealing between the each end of the intermediate tube and the cylinder, a connecting pipe provided on a sidewall of the intermediate tube and having a distal end extending to the outside of the outer tube, an opening provided in the outer tube to allow the hydraulic fluid to flow into the reservoir from the outside of the outer tube through the outside of the connecting pipe, and a partition member provided in the reservoir and having a partition regulating a flow of hydraulic fluid from the opening to the reservoir in the shock absorber as installed between the two members. The partition member is formed of a flexible or pliable resin or rubber material. The partition member has a fitting hole to be fitted to the connecting pipe with an interference, and a projection projecting in a direction reverse to a direction in which the partition projects so that the projection is abutted against the reduced-diameter portion or one end of the intermediate tube.

In addition, to solve the above-described problem, the present invention provides a shock absorber manufacturing method applicable to the shock absorber of any of claims 1 to 3. The manufacturing method is characterized in that the partition member is assembled to the intermediate tube by abutting the projection of the partition member against the reduced-diameter portion or one end of the intermediate tube, and thereafter, fitting the fitting hole of the partition member to the connecting pipe of the intermediate tube.

Advantages of Invention

It is possible according to the present invention to improve the productivity and assembleability of a shock absorber having a partition member in a reservoir.

DESCRIPTION OF EMBODIMENTS

Figure 1:
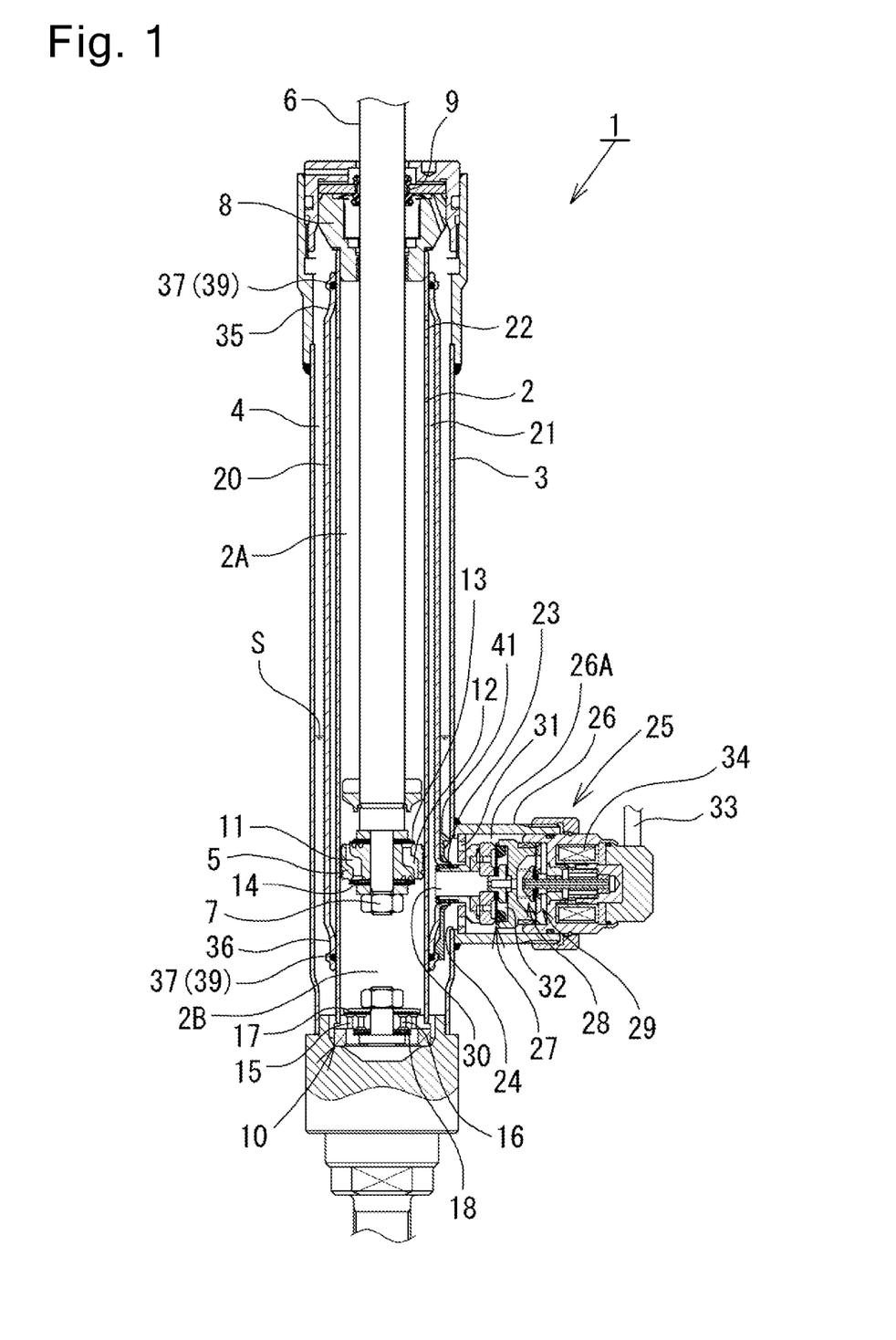
FIG. 1 is a sectional view taken along an axial plane of a shock absorber according to an embodiment of the present invention.

FIG. 1 illustrates a damping force adjustable hydraulic shock absorber with a control valve mounted alongside as a shock absorber 1 according to an embodiment of the present invention. In the following explanation, the vertical direction in FIG. 1 is defined as it is as the vertical direction of the shock absorber 1 as installed, for the sake of convenience.

As shown in FIG. 1, the shock absorber 1 has a dual-tube structure comprising a cylinder 2 and an outer tube 3 provided around the outer periphery of the cylinder 2. An annular reservoir 4 is formed between the cylinder 2 and the outer tube 3. The cylinder 2 has a piston 5 slidably fitted therein. The piston 5 divides the interior of the cylinder 2 into two chambers, i.e. a cylinder upper chamber 2A and a cylinder lower chamber 2B. The piston 5 has one end of a piston rod 6 connected thereto with a nut 7. The other end of the piston rod 6 extends through the cylinder upper chamber 2A and further extends to the outside of the cylinder 2 through a rod guide 8 and an oil seal 9, which are fitted to the upper end portion of the dual-tube structure comprising the cylinder 2 and the outer tube 3.

It should be noted that the lower end of the cylinder 2 is provided with a base valve 10 dividing the cylinder lower chamber 2B and the reservoir 4 from each other. The piston 5 is provided with passages 11 and 12 providing communication between the cylinder upper and lower chambers 2A and 2B. The passage 12 is provided with a check valve 13 allowing only a flow of hydraulic fluid from the cylinder lower chamber 2B toward the cylinder upper chamber 2A. The passage 11 is provided with a disk valve 14 that opens when the pressure of hydraulic fluid in the cylinder upper chamber 2A reaches a predetermined pressure to relieve the hydraulic fluid (pressure) in the cylinder upper chamber 2A to the cylinder lower chamber 2B.

Meanwhile, the base valve 10 is provided with passages 15 and 16 providing communication between the cylinder lower chamber 2B and the reservoir 4. The passage 15 is provided with a check valve 17 allowing only a flow of hydraulic fluid from the reservoir 4 toward the cylinder lower chamber 2B. The passage 16 is provided with a disk valve 18 that opens when the pressure of hydraulic fluid in the cylinder lower chamber 2B reaches a predetermined pressure to relieve the hydraulic fluid (pressure) in the cylinder lower chamber 2B to the reservoir 4. It should be noted that the reservoir 4 has the hydraulic fluid and a gas sealed therein.

Figure 3:
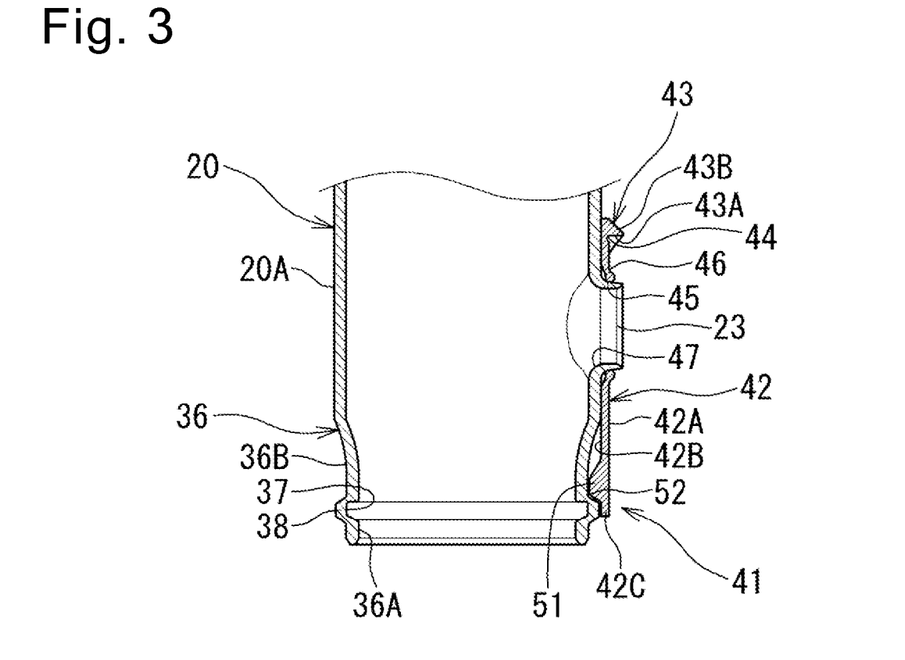
FIG. 3 is an enlarged view of an important part of the shock absorber shown in FIG. 1, which explains the baffle plate mounting structure.

The cylinder 2 has an intermediate tube 20 fitted over the outer periphery thereof. As shown in FIG. 3, the intermediate tube 20 has reduced-diameter portions 35 and 36 respectively formed at upper and lower ends thereof by swaging, for example. The reduced-diameter portions 35 and 36 have seal ring grooves 37 (annular grooves) formed on their inner peripheries 35A and 36A, respectively, by beading, for example. Meanwhile, the reduced-diameter portions 35 and 36 have annular flange portions 38 formed on their outer peripheries 35B and 36B, respectively, at positions corresponding to the seal ring grooves 37. The seal ring grooves 37 are fitted with seal rings 39, respectively. The seal rings 39 are brought into close contact with the outer peripheral surface of the cylinder 2, thereby forming an annular passage 21 between the cylinder 2 and the intermediate tube 20. The passage 21 is communicated with the cylinder upper chamber 2A through a passage 22 provided in an upper end sidewall of the cylinder 2. It should be noted that the intermediate tube 20 is formed such that the outer diameter of the body portion, which is not reduced in diameter, and the outer diameter of the flange portions 38 are substantially equal to each other. The sidewall of a lower part of the intermediate tube 20 is provided with a connecting pipe 23 having an axis perpendicularly intersecting the axis of the intermediate tube 20 and extending to the outside of the outer tube 3. It should be noted that, although this embodiment shows an example in which the connecting pipe 23 is integrally formed with the intermediate tube 20, the connecting pipe may be a discrete member formed separately from the intermediate tube.

The sidewall of the outer tube 3 is provided with an opening 24 in substantially concentric and coaxial relation to the connecting pipe 23. The damping force adjusting mechanism 25 is attached to the opening 24 in the sidewall of the outer tube 3. The damping force adjusting mechanism 25 has a circular cylindrical casing 26 joined to the sidewall of the outer tube 3 in such a manner as to surround the opening 24. The casing 26 is provided therein with a pilot-type (back-pressure type) main valve 27 and a pilot valve 28, which is a solenoid-driven pressure control valve controlling the valve-opening pressure of the main valve 27. Further, a fail-safe valve 29 is provided downstream of the pilot valve 28. The fail-safe valve 29 operates when there is a failure. The connecting pipe 23 of the intermediate tube 20 has a coupling pipe 30 fluid-tightly inserted therein. The coupling pipe 30 forms an inlet passage of the damping force adjusting mechanism 25. The hydraulic fluid introduced into the coupling pipe 30 from the annular passage 21 passes through the main valve 27, the pilot valve 28, and the fail-safe valve 29 and flows into a chamber 26A surrounded by the casing 26. Further, the hydraulic fluid in the chamber 26A passes through a passage 31 formed in an end portion of the casing 26 and flows into the reservoir 4 through the opening 24 of the outer tube 3.

At this time, before the main valve 27 opens, the pilot valve 28 generates a damping force by controlling the flow of hydraulic fluid. When the main valve 27 is open, damping force is generated mainly by the main valve 27. In addition, a part of hydraulic fluid at the upstream side of the pilot valve 28 is introduced into a back pressure chamber 32 at the rear of the main valve 27. The pressure in the back pressure chamber 32 acts on the main valve 27 in the direction for closing the main valve 27. The damping force is adjusted by controlling the control pressure of the pilot valve 28. The control pressure of the pilot valve 28 is controlled with a control electric current supplied to a solenoid 34 through a harness 33. Thus, the valve-opening pressure and the degree of opening of the main valve 27 are adjusted by controlling the control pressure of the pilot valve 28 to change the inner pressure in the back pressure chamber 32.

It should be noted that the fail-safe valve 29 functions as follows. The fail-safe valve 29 closes when the vehicle is stopped due to signal waiting, or when the supply of electric current to the solenoid 34 is cut off. When the supply of electric current to the solenoid 34 is cut off, the fail-safe valve 29 restricts the flow of hydraulic fluid in place of the pilot valve 28, which is in a normally open state, thereby preventing an excessive reduction of damping force and maintaining an appropriate damping force.

Figure 2:
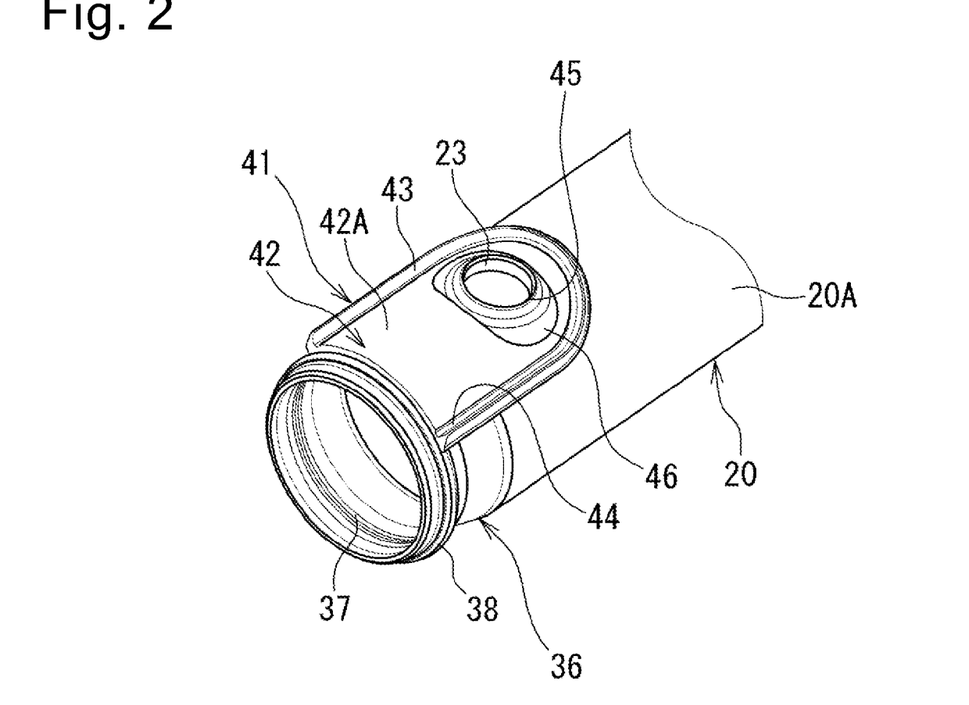
FIG. 2 is a perspective view for explaining the mounting structure of a baffle plate.
Figure 4:
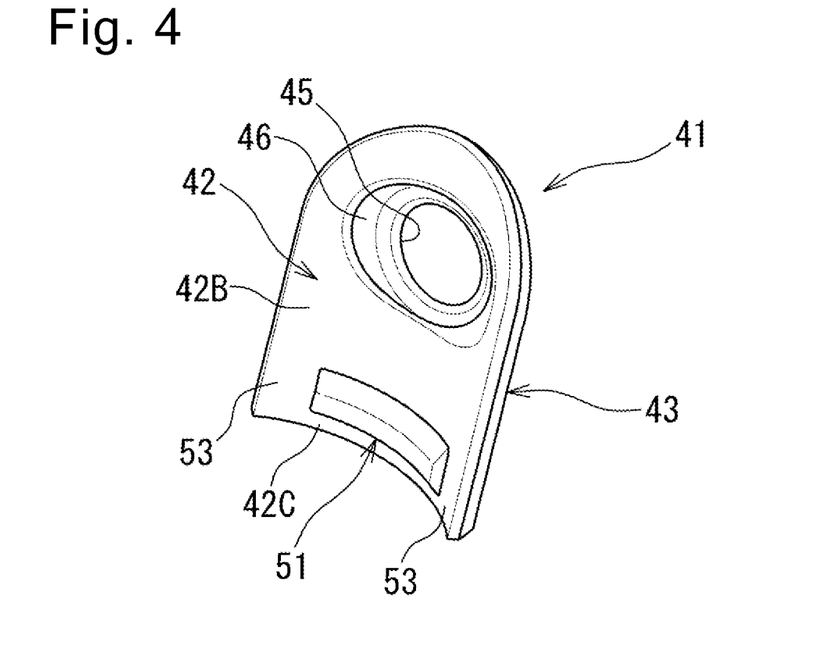
FIG. 4 is a perspective view of the baffle plate shown in FIG. 3, as seen from the rear side of the baffle plate as a single component.

The reservoir 4 is provided therein with a baffle plate 41 (partition member) disposed facing the opening 24 of the outer tube 3 to regulate the flow of hydraulic fluid flowing into the reservoir 4 from the damping force adjusting mechanism 25 through the passage 31 and the opening 24. FIG. 2 is an explanatory view showing the mounting structure of the baffle plate 41 to the intermediate tube 20. FIG. 3 is an enlarged view of a lower part of the intermediate tube 20 and the baffle plate 41 as shown in FIG. 1. FIG. 4 is a perspective view of the baffle plate 41 as seen from the rear side (side where there is an abutment surface 42B, which will be explained later) of the baffle plate 41 as a single component. It should be noted that the vertical direction in FIG. 3 is defined as the vertical direction of the baffle plate 41 as installed, in the same way as in the explanation made with reference to FIG. 1. In this embodiment, the baffle plate 41 is an integrally formed component made of a single material. Examples of materials usable to form the baffle plate 41 include flexible or pliable NBR (nitrile rubber).

The baffle plate 41 has a sheet-shaped abutment portion 42 curved along the outer peripheral surface 20A of the intermediate tube 20, with a part thereof abutted against the outer peripheral surface 20A of the intermediate tube 20. As will be understood from FIGS. 2 and 4, the abutment portion 42 is formed such that an upper portion thereof has a semicircular shape and a lower portion thereof has a rectangular shape in plan view. The lower end of the baffle plate 41 extends to cover a part of the outer periphery of the flange portion 38 as the baffle plate 41 is mounted to the intermediate tube 20. In other words, the lower end of the baffle plate 41 is provided with a peripheral edge 42C placed in close contact with the outer periphery of the flange portions 38. The baffle plate 41 has a lip 43 (partition) abutted against the inner peripheral surface of the outer tube 3 in such a manner as to surround the opening 24 when the baffle plate 41 is installed in the reservoir 4. As shown in FIG. 2, the lip 43 extends in an arch shape along the outer periphery of the abutment portion 42. In other words, the lip 43 has an arcuate portion of a semicircular arc shape in front view and a pair of rectilinear portions extending downward (as seen in FIG. 3) from the opposite ends of the arcuate portion.

As shown in FIG. 3, the lip 43 is formed in a substantially trapezoidal cross-sectional configuration and includes an inner wall surface 43A stood substantially perpendicular to the abutment portion 42 and hence the outer peripheral surface 20A of the intermediate tube 20, and a slanted surface 43B extending at an acute angle to the inner wall surface 43A. In this embodiment, the baffle plate 41 is provided with a recess 44 between the lip 43 and a non-abutting surface 42A of the abutment portion 42 which is a right-hand side surface (in FIG. 3) of the abutment portion 42, i.e. a surface on the side of the abutment portion 42 where the hydraulic fluid in the reservoir 4 is sealed. The recess 44 is provided for the purpose of reducing the rigidity of the lip 43 at the proximal end thereof on the inner wall surface 43A side of the lip 43, thereby making it easy for the lip 43 to collapse inward. In other words, the recess 44 comprises a groove extending along the proximal end of the lip 43 on the inner wall surface 43A side.

The baffle plate 41 has a fitting hole 45 provided in the center of the upper part thereof. The fitting hole 45 is to be fitted to the connecting pipe 23 of the intermediate tube 20 with a predetermined interference. That is, the fitting hole 45 has an inner diameter smaller than the outer diameter of the connecting pipe 23. As shown in FIG. 4, the baffle plate 41 further has a bulged portion 46 (thin-walled portion) provided around the fitting hole 45. The bulged portion 46 is formed in a substantially elliptic shape whose major axis extends in the horizontal direction (visual line direction in FIG. 3) in plan view. The baffle plate 41 is formed such that the thickness of the bulged portion 46 is smaller (thinner) than the thickness of the abutment portion 42, i.e. the thickness of a portion around the bulged portion 46 that is to be abutted against the intermediate tube 20. Consequently, the bulged portion 46 of the baffle plate 41 can be lifted (separated) from the proximal end portion of the connecting pipe 23, i.e. a rounded portion 47 formed between the sidewall of the intermediate tube 20 and the connecting pipe 23, and a portion of the baffle plate 41 that surrounds the lifted portion (bulged portion 46) can be fluid-tightly brought into close contact with the outer peripheral surface 20A of the intermediate tube 20.

As shown in FIGS. 3 and 4, the baffle plate 41 has a projection 51 projecting in a direction reverse to the direction in which the lip 43 (partition) projects. In other words, the projection 51 is provided on an abutment surface 42B of the abutment portion 42 of the baffle plate 41. The projection 51 is formed in a substantially trapezoidal shape in a section taken along an axial plane of the intermediate tube 20. As shown in FIG. 3, the projection 51 of the baffle plate 41, as mounted to the intermediate tube 20, extends in the circumferential direction of the reduced-diameter portion 36 along the upper side surface (slanted surface) of the annular flange portion 38. In other words, the projection 51 is fitted into an annular recess 52 formed in the reduced-diameter portion 36 of the intermediate tube 20. More specifically, the projection 51 is fitted into a recess 52 formed in an upper portion of the flange portion 38. It should be noted that, in this embodiment, the projection 51 is provided to abut against, i.e. to come in contact with, the recess 52 with a clearance therebetween. However, the projection 51 may be fitted into the recess 52 with an interference by forming the recess 52 smaller than the projection 51. That is, the projection 51 and the recess 52 may be arranged in any form, provided that rotation of the baffle plate 41 can be suppressed.

As shown in FIG. 4, in this embodiment, the projection 51 is not formed near the lip 43 (partition). That is, the projection 51 is not formed at a position on the back of the baffle plate 41 corresponding to the lip 43. Therefore, the opposite corner portions 53 of the lower part of the baffle plate 41 can be relatively reduced in rigidity as compared with a structure in which the projection 51 extends over the entire circumferential length of the lower end peripheral edge 42C of the abutment portion 42 (i.e. a structure in which the projection 51 is formed over the entire circumferential length of the peripheral edge 42C). Consequently, when the intermediate tube 20 fitted with the baffle plate 41 is assembled into the outer tube 3, the corner portions 53 of the baffle plate 41 can be bent. Thus, assembleability can be improved.

Next, the operation of this embodiment will be explained.

It should be noted that the shock absorber 1 is installed between two members movable relative to each other, i.e. a sprung member (vehicle body-side member) and an unsprung member (wheel-side member) of a suspension system of a vehicle, with the rod guide 8 side facing up, and the base valve 10 side facing down.

During the extension stroke of the piston rod 6, the movement of the piston 5 in the cylinder 2 closes the check valve 13 of the piston 5. Before the disk valve 14 opens, the pressurized hydraulic fluid in the cylinder upper chamber 2A flows through the passage 22 and the annular passage 21 and flows into the damping force adjusting mechanism 25 from the coupling pipe 30. The hydraulic fluid flowing into the damping force adjusting mechanism 25 from the coupling pipe 30 flows through the main valve 27, the pilot valve 28, and the fail-safe valve 29 and flows into the chamber 26A in the casing 26. Further, the hydraulic fluid passes through the passage 31 and the opening 24 of the outer tube 3 and flows into the reservoir 4.

At this time, the check valve 17 of the base valve 10 opens, and an amount of hydraulic fluid corresponding to the amount by which the piston rod 6 is withdrawn to the outside of the cylinder 2 is supplied to the cylinder lower chamber 2B from the reservoir 4. It should be noted that when the pressure in the cylinder upper chamber 2A reaches the valve-opening pressure of the disk valve 14 of the piston 5, the disk valve 14 opens to relieve the pressure in the cylinder upper chamber 2A into the cylinder lower chamber 2B, thereby preventing an excessive increase in pressure in the cylinder upper chamber 2A.

On the other hand, during the compression stroke of the piston rod 6, the movement of the piston 5 in the cylinder 2 opens the check valve 13 of the piston 5 and closes the check valve 17 of the base valve 10. Before the disk valve 18 opens, the hydraulic fluid in the cylinder lower chamber 2B flows into the cylinder upper chamber 2A, and an amount of hydraulic fluid corresponding to the amount by which the piston rod 6 enters the cylinder 2 flows out of the cylinder upper chamber 2A and passes through the passage 22 and the annular passage 21 and flows into the damping force adjusting mechanism 25 from the coupling pipe 30.

The hydraulic fluid flowing into the damping force adjusting mechanism 25 from the coupling pipe 30 flows through the main valve 27, the pilot valve 28, and the fail-safe valve 29 and flows into the chamber 26A in the casing 26. Further, the hydraulic fluid passes through the passage 31 and the opening 24 of the outer tube 3 to flow into the reservoir 4. It should be noted that when the pressure in the cylinder lower chamber 2B reaches the valve-opening pressure of the disk valve 18 of the base valve 10, the disk valve 18 opens to relieve the pressure in the cylinder lower chamber 2B into the reservoir 4, thereby preventing an excessive increase in pressure in the cylinder lower chamber 2B.

Thus, before the main valve 27 opens (in a low piston speed region), the pilot valve 28 of the damping force adjusting mechanism 25 generates a damping force. After the main valve 27 has opened (in a high piston speed region), the main valve 27 generates a damping force according the degree of opening thereof. The damping force can be adjusted by controlling the control pressure of the pilot valve 28 by controlling the control electric current supplied to the solenoid 34. As a result of controlling the control pressure of the pilot valve 28, the pressure in the back pressure chamber 32 changes, and it is thus possible to adjust the valve-opening pressure and the degree of opening of the main valve 27. If the solenoid 34 should fail, the fail-safe valve 29 closes to restrict the flow of hydraulic fluid in place of the pilot valve 28, which is now open at all times, thereby preventing an excessive reduction of damping force and maintaining an appropriate damping force.

The hydraulic fluid flowing (discharged) into the reservoir 4 from the chamber 26A in the casing 26 through the passage 31 and the opening 24 of the outer tube 3 is sealingly contained in the space surrounded by the arch-shaped lip 43 (partition) of the baffle plate 41 (partition member). In other words, the hydraulic fluid flowing into the reservoir 4 is isolated from the surface S of hydraulic fluid in the reservoir 4 by the lip 43 of the baffle plate 41, which serves as a partition. Thus, the baffle plate 41 regulates the flow of hydraulic fluid flowing into the reservoir 4 from the opening 24 in the upward and circumferential directions of the shock absorber 1 as installed. Accordingly, it is possible to prevent the generation of vortexes and bubbles in the neighborhood of the surface S of hydraulic fluid in the reservoir 4 which would otherwise be caused by a jet of hydraulic fluid flowing into the reservoir 4 from the opening 24. As a result, it is possible to suppress the occurrence of aeration due to stirring of the gas and the hydraulic fluid, and a stable damping force can be obtained.

In addition, the baffle plate 41 eases the rapid enlargement of the flow path area of hydraulic fluid flowing into the reservoir 4 from the damping force adjusting mechanism 25. Therefore, it is possible to suppress the rapid increase in flow velocity of hydraulic fluid when flowing into the reservoir 4, and the generation of vortexes can be prevented. As a result, it is possible to suppress the occurrence of cavitation due to the generation of vortexes and hence possible to obtain a stable damping force.

This embodiment provides the following advantages.

According to this embodiment, the baffle plate 41 (partition member) is manufactured by being integrally formed of a single material of flexible or pliable NBR (nitrile rubber), and the fitting hole 45 is secured (fitted) to the connecting pipe 23 of the intermediate tube 20 by utilizing elastic force of rubber generated by enlarging the diameter of the fitting hole 45, thereby installing the baffle plate 41 in the reservoir 4 (to the intermediate tube 20) in such a manner that the baffle plate 41 embraces the connecting pipe 23.

Thus, as compared with a conventional shock absorber (reference numerals omitted) having a structure in which a baffle plate obtained by vulcanization-bonding a rubber partition to a press-formed metallic plate is secured to an intermediate tube (connecting pipe) by using a securing member, e.g. a toothed washer, the shock absorber of this embodiment enables elimination of a securing member which would otherwise be used to secure the baffle plate 41 to the intermediate tube 20, and it is therefore possible to improve the productivity of the baffle plate 41 and hence the shock absorber 1 and also possible to reduce the manufacturing cost.

In this embodiment, the fitting hole 45 is fluid-tightly fitted to the connecting pipe 23 of the intermediate tube 20 with an interference. It is therefore possible to prevent the hydraulic fluid flowing into the reservoir 4 from the opening 24 of the outer tube 3 from entering the area between the outer peripheral surface 20A of the intermediate tube 20 and the abutment surface 42B of the abutment portion 42 of the baffle plate 41 through the area between the connecting pipe 23 and the fitting hole 45 and hence possible to suppress the occurrence of aeration due to the hydraulic fluid flowing (jetting) out from between the baffle plate 41 and the intermediate tube 20 (connecting pipe 23).

Further, the bulged portion 46 (thin-walled portion) is formed between the abutment portion 42 and fitting hole 45 of the baffle plate 41 so that the fitting hole 45 (abutment portion 42) is lifted (separated) from the rounded portion 47 formed at the root of the connecting pipe 23. Accordingly, it is possible to prevent the abutment portion 42 from being lifted from the outer peripheral surface 20A of the intermediate tube 20 which might otherwise occur due to the contact of the fitting hole 45 with the rounded portion 47.

In this embodiment, the baffle plate 41 has the recess 44 formed between the inner wall surface 43A of the lip 43 (partition) and the non-abutting surface 42A of the abutment portion 42, i.e. the surface of the baffle plate 41 on the side thereof where the hydraulic fluid in the reservoir 4 is sealingly contained, such that the recess 44 extends along the proximal end of the lip 43 on the inner wall surface 43A side thereof. Therefore, it is possible to ensure the durability and strength required of the lip 43 and, at the same time, possible to reduce the rigidity of the lip 43 at the inner wall surface 43A side proximal end thereof.

With the conventional shock absorber (reference numerals omitted), when the intermediate tube fitted with the baffle plate is assembled into the outer tube, if the rigidity of the lip of the baffle plate is large as compared with the clearance between the outer tube and the intermediate tube, the outer tube and the intermediate tube may be decentered with respect to each other, resulting in degradation of assembleability. In contrast, with this embodiment, when the intermediate tube 20 fitted with the baffle plate 41 is assembled into the outer tube 3, the lip 43 contacting the inner peripheral surface of the outer tube 3 can be collapsed inward. Therefore, the outer tube 3 and the intermediate tube 20 can be easily centered with respect to each other. Consequently, assembleability improves, and the productivity of the shock absorber 1 can be improved.

In this embodiment, the baffle plate 41 has the projection 51 formed on the abutment surface 42B to extend along the lower end peripheral edge 42C, and the projection 51 is fitted into the recess 52 formed in the reduced-diameter portion 36 of the intermediate tube 20. Therefore, the curved sheet-shaped baffle plate 41 can be prevented from rotating about the connecting pipe 23 relative to the intermediate tube 20. Accordingly, it is possible to improve assembleability when the intermediate tube 20 fitted with the baffle plate 41 is assembled into the outer tube 3, and it is possible for the baffle plate 41 to function surely after the intermediate tube 20 fitted with the baffle plate 41 has been assembled into the outer tube 3. Further, because the projection 51 is not formed at a position on the back of the baffle plate 41 corresponding to the lip 43, it is possible to relatively reduce the rigidity of the opposite corner portions 53 of the lower part of the baffle plate 41. Consequently, the intermediate tube 20 fitted with the baffle plate 41 can be assembled into the outer tube 3 while bending the corner portions 53 of the baffle plate 41 toward the intermediate tube 20. Accordingly, assembleability can be further improved.

It should be noted that the present invention is not limited to the above-described embodiment but may be arranged, for example, as follows.

Figure 5:
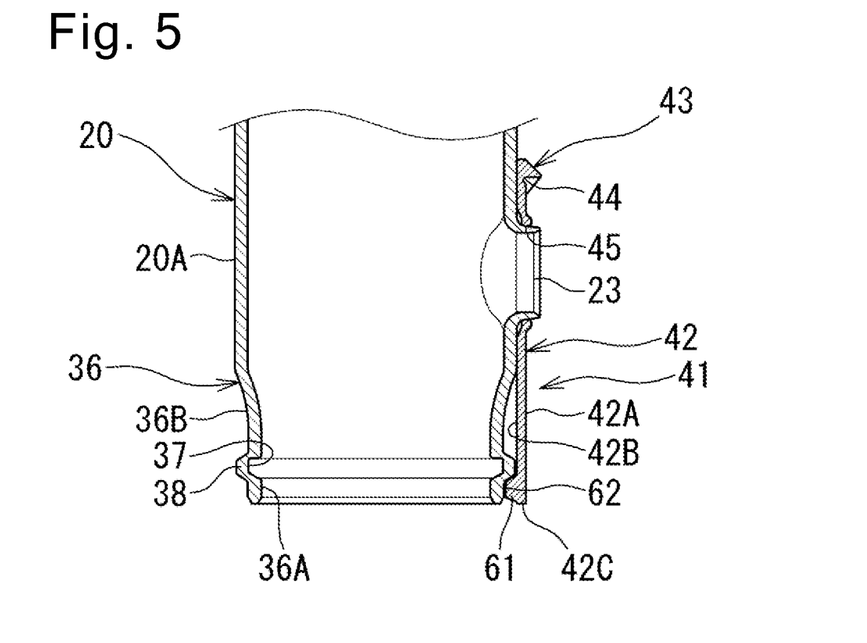
FIG. 5 is an explanatory view of a modification of the baffle plate shown in FIGS. 3 and 4, which corresponds to FIG. 3.
Figure 6:
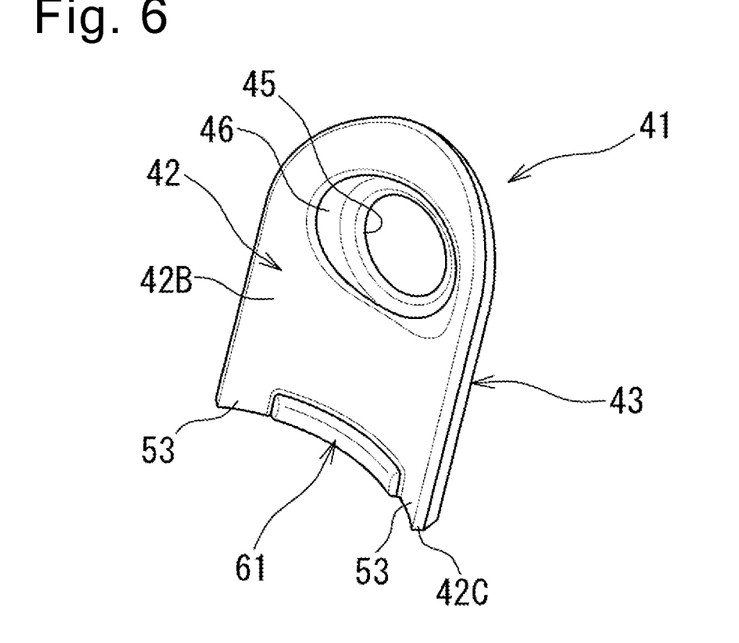
FIG. 6 is a perspective view of the baffle plate shown in FIG. 5, as seen from the rear side of the baffle plate as a single component.

As shown in FIGS. 5 and 6, the baffle plate 41 is extended so that the lower end of the baffle plate 41 as mounted to the intermediate tube 20 reaches the lower end of the reduced-diameter portion 36 of the intermediate tube 20, and a projection 61 is formed along the lower end peripheral edge 42C of the extended baffle plate 41. In this case, the projection 61 is fitted into an annular recess 62 formed in the reduced-diameter portion 36 of the intermediate tube 20. More specifically, the projection 61 is fitted into a recess 52 formed in the lower portion of the flange portion 38.

With this structure, it is possible to provide the same advantages as those of the shock absorber 1 having the baffle plate 41 shown in FIGS. 3 and 4.

Figure 7:
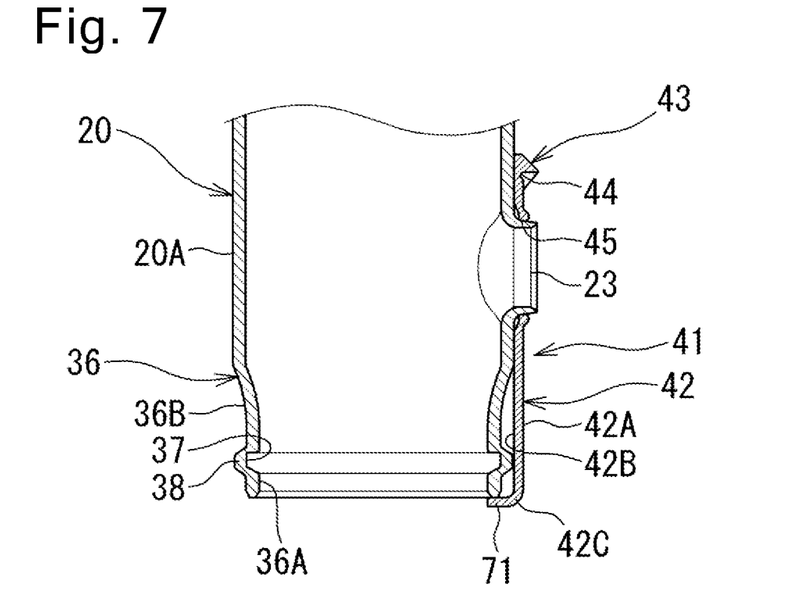
FIG. 7 is an explanatory view of a further modification of the baffle plate shown in FIGS. 3 and 4, which corresponds to FIG. 3.
Figure 8:
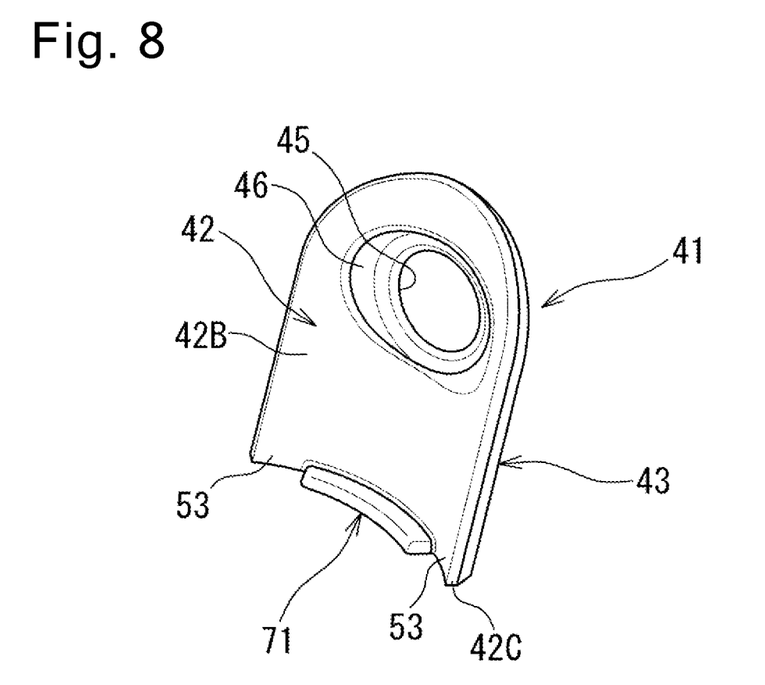
FIG. 8 is a perspective view of the baffle plate shown in FIG. 7, as seen from the rear side of the baffle plate as a single component.

The structure may be as shown in FIGS. 7 and 8. The baffle plate 41 is extended so that the lower end of the baffle plate 41 as mounted to the intermediate tube 20 reaches the lower end of the reduced-diameter portion 36 of the intermediate tube 20, and the lower end of the extended baffle plate 41 is bent to project inward in an inward flange shape, thereby forming a projection 71. In this case, the intermediate tube 20 and the baffle plate 41 are configured such that the projection 71 is locked (detented) by the end surface (one end) of the reduced-diameter portion 36 of the intermediate tube 20.

With this structure, it is possible to provide the same advantages as those of the shock absorbers 1 having the baffle plates 41 shown in FIGS. 3 to 6.

It should be noted that, for the baffle plates 41 shown in FIGS. 3 to 8, the degree of fit (interference or clearance) between the projection 51 (61) and the recess 52 (62) formed in the reduced-diameter portion 36 of the intermediate tube 20 or the degree of locking force acting between the projection 71 and the end surface (one end) of the reduced-diameter portion 36 of the intermediate tube 20 is determined according to the baffle plate holding force in the reservoir 4 required from the design point of view. For example, if priority is given to the baffle plate holding force in the reservoir 4, the baffle plate 41 may be configured such that the projection 51 (61, 71) is formed over the entire circumferential length of the lower end of the baffle plate 41 so that the projection 51 (61, 71) lies also at a position on the back of the baffle plate 41 corresponding to the lip 43.

Further, the projections 51, 61 and 71 may be combined together, according to need, to form the baffle plate 41.

Further, the baffle plates 41 shown in FIGS. 3 to 8 may be mounted to the intermediate tube 20 by fitting the fitting hole 45 of the baffle plate 41 to the connecting pipe 23 of the intermediate tube 20, and thereafter, fitting the projection 51 (61) of the baffle plate 41 into the recess 52 (62) formed in the reduced-diameter portion 36 of the intermediate tube 20 or locking the projection 71 to the end surface (one end) of the reduced-diameter portion 36 of the intermediate tube 20. However, the baffle plate 41 may also be mounted to the intermediate tube 20 by fitting the projection 51 (61) of the baffle plate 41 into the recess 52 (62) of the reduced-diameter portion 36 of the intermediate tube 20 or locking the projection 71 to the end surface (one end) of the reduced-diameter portion 36 of the intermediate tube 20 to thereby position (detent) the lower part of the baffle plate 41 with respect to the intermediate tube 20, and thereafter, fitting the fitting hole 45 of the baffle plate 41 to the connecting pipe 23 of the intermediate tube 20. By so doing, assembleability can be further improved.

Further, although the foregoing embodiments show a structure in which only a resin or rubber material is used to form the partition member, the partition member may partially comprise a core metal.

The present application claims priority to Japanese Patent Application No. 2014-223271 filed on Oct. 31, 2014. The entire disclosure of Japanese Patent Application No. 2014-223271 filed on Oct. 31, 2014 including specification, claims, drawings and summary is incorporated herein by reference in its entirety.

LIST OF REFERENCE SIGNS

1: shock absorber; 2: cylinder; 3: outer tube; 4: reservoir; 5: piston; 6: piston rod; 20: intermediate tube; 23: connecting pipe; 24: opening; 35, 36: reduced-diameter portion; 37: seal ring groove (annular groove); 39: seal ring (seal member); 41: baffle plate (partition member); 43: lip (partition); 45: fitting hole; 51, 61, 71: projection.

The invention claimed is:

1. A shock absorber to be installed between two members movable relative to each other, the shock absorber comprising:

a cylinder having a hydraulic fluid sealed therein;

a piston disposed in the cylinder;

a piston rod connected to the piston and extending to an outside of the cylinder;

an outer tube provided around an outer periphery of the cylinder;

a reservoir formed between the cylinder and the outer tube and having the hydraulic fluid and a gas sealed therein; and an intermediate tube provided between the cylinder and the outer tube;

the intermediate tube including:

a reduced-diameter portion formed at each end of the intermediate tube;

an annular groove formed in the reduced-diameter portion to accommodate a seal member sealing between the both ends of the intermediate tube and the cylinder; and a connecting pipe provided on a sidewall of the intermediate tube and having a distal end extending to an outside of the outer tube;

the outer tube having an opening formed therein to allow the hydraulic fluid to flow into the reservoir from the outside of the outer tube through an outside of the connecting pipe;

the shock absorber further comprising:

a partition member provided in the reservoir and including a partition configured to regulate a flow of hydraulic fluid from the opening to the reservoir in the shock absorber as the shock absorber being installed between the two members;

the partition member being formed of a flexible or pliable resin or rubber material;

the partition member having a fitting hole to be fitted to the connecting pipe, and a projection that projects in a direction reverse to a direction in which the partition projects so that the projection is abutted against the intermediate tube, wherein an interference fit is formed between the connecting pipe and the fitting hole by the connecting pipe being press fitted in the fitting hole, the fitting hole having an inner diameter that is smaller than the outer diameter of the connecting pipe; and the projection being abutted against the reduced-diameter portion or one end of the intermediate tube, the projection being formed to extend in a circumferential direction of the intermediate tube.

2. The shock absorber of claim 1, wherein the projection of the partition member is fitted to the reduced-diameter portion or one end of the intermediate tube with an interference.

3. The shock absorber of claim 1, wherein the projection of the partition member is not formed near the partition.

4. The shock absorber of claim 1, wherein the partition member has an abutment portion curved along an outer peripheral surface of the intermediate tube, and the partition extends along an outer periphery of the abutment portion, the partition including an arcuate portion of a semicircular arc shape and a pair of rectilinear portions extending axially downward relative to the cylinder from opposite ends of the arcuate portion.

5. The shock absorber of claim 4, wherein the projection of the partition member is fitted to the reduced-diameter portion or one end of the intermediate tube with an interference.

6. The shock absorber of claim 4, wherein the projection of the partition member is not formed near the partition.

7. The shock absorber of claim 5, wherein the projection of the partition member is not formed near the partition.

* * * * *